United States Patent [19]

Saito et al.

[11] Patent Number: 5,149,751

[45] Date of Patent: Sep. 22, 1992

[54] PROCESS FOR THE PREPARATION OF 1-MONOALKYL-DIMETHYLSILYL-PROPYNE POLYMERS

[75] Inventors: Yukihiro Saito; Katsunori Waragai, both of Kawasaki; Shiro Asakawa, Tokyo, all of Japan

[73] Assignee: Matsushita Electric Industrial Co., Ltd., Osaka, Japan

[21] Appl. No.: 402,419

[22] Filed: Sep. 5, 1989

[30] Foreign Application Priority Data

Sep. 5, 1988 [JP] Japan .................. 63-221712

[51] Int. Cl.$^5$ .................................. C08H 4/58
[52] U.S. Cl. ................... 526/178; 526/128; 526/221; 528/14
[58] Field of Search ............ 526/178, 221, 128; 528/14

[56] References Cited

U.S. PATENT DOCUMENTS 4,600,484  7/1986  Drahnak ............... 528/15
4,755,193  7/1988  Higashimura et al. ......... 55/16

FOREIGN PATENT DOCUMENTS 59155409  9/1984  Japan .

OTHER PUBLICATIONS

Macromolecules, vol. 17, No. 2, Feb. 1984, pp. 126-129, American Chemical Society, Washington, U.S.; T. Masuda et al.: "Polymerization of 1-chloro-2-phenylacetylene by MoCl5-based catalysts".

Accounts of Chemical Research, vol. 17, 1984, pp. 51-56, American Chemical Society, Washington, U.S.; T. Masuda: "Synthesis of high polymers from substituted acetylenes: exploitation of molybdenum- and tungsten-based catalysts".

"Gas Permeability of Polyacetylenes Carrying Substituents" by Higashimura et al.; Journal of Applied Polymer Science, vol. 30, pp. 1605-1616 (1985).

*Primary Examiner*—Paul R. Michl
*Assistant Examiner*—Tae H. Yoon
*Attorney, Agent, or Firm*—Lowe, Price, LeBlanc & Becker

[57] ABSTRACT

A process for the preparation of 1-monoalkyl ($C_1$-$C_4$)dimethylsilyl-1-propyne polymers which comprises polymerizing a 1-monoalkyl ($C_1$-$C_4$)dimethylsilyl-1-propyne monomer in the presence of a compound of a transition metal and a member selected from $\alpha,\omega$-dihydropolydialkylsiloxanes and polyalkyldihydrosiloxanes in a solvent inert for the polymerization. The polymerization reaction proceeds at low temperatures in an efficient manner. The membrane of the resultant polymer has a high gas transmission and suffers little degradation when placed under severe temperature conditions.

15 Claims, No Drawings

PROCESS FOR THE PREPARATION OF 1-MONOALKYL-DIMETHYLSILYLPROPYNE POLYMERS

BACKGROUND OF THE INVENTION

1. Field of the Invention

This invention relates to a process for the polymerization of 1-monoalkyl ($C_1$–$C_4$)dimethylsilyl-1-propynes.

2. Description of the Prior Art

A variety of processes for the preparation of polymers of acetylene compounds have been known and investigated. These processes commonly have several problems such as a difficulty in obtaining high molecular weight polymers and a low yield.

On the other hand, few studies on the polymerization of 1-monoalkyldimethylsilyl-1-propynes which are one of di-substituted acetylene compounds have been made since they have poor reactivity. In recent years, however, Higashimura et al developed catalysts effective for obtaining high molecular weight polymers of the propynes, which is known from U.S. Pat. No. 4,755,193 and Japanese Laid-open Patent Application No. 59-155409. In these publications, it is stated that polymers of 1-monoalkyl($C_1$–$C_4$)dimethylsilyl-1-propynes are obtained by polymerization of 1-monoalkyl($C_1$–$C_4$)dimethylsilyl-1-propynes in the presence of a transition metal compound of Group V of the Periodic Table. In this process, a relatively high polymerization temperature is used ranging from 30° to 100° C., within which a higher temperature is favored and a long reaction time of from 12 to 36 hours is necessary. The 1-trimethylsilyl-1-propyne polymer obtained by the above process has very high gas permeability but its characteristic properties degraded considerable. This is reported by Higashimura et al (Journal of Applied Polymer Science: JAPS, Vol. 30, pp., 1605–1616, 1985). According to this literature, when the polymer is thermally treated at 100° C. for about 5 hours, the oxygen permeability coefficient ($P_{O_2}$) reduced to 1/5 of the initial value.

SUMMARY OF THE INVENTION

It is accordingly an object of the invention to provide a process for the polymerization of 1-monoalkyl($C_1$–$C_4$)dimethylsilyl-1-propyne which overcomes the drawbacks of the prior art process and wherein the resultant polymer exhibits stable gas permeability with a much reduced degree of degradation of the characteristic properties.

It is another object of the invention to provide a process for the preparation of 1-monoalkyl ($C_1$–$C_4$)dimethylsilyl-1-propyne polymers wherein the polymers are efficiently obtained at relatively low temperatures within a time shorter than in the prior art process.

The process of the invention comprises polymerizing a 1-monoalkyl($C_1$–$C_4$)dimethylsilyl-1-propyne compound in the presence of a compound of a transition metal of Group V of the Periodic Table and an α,ω-dihydropolydialkylsiloxane and/or a polyalkyldihydrosiloxane in a solvent inert for the polymerization. Preferably, the compound of the transition metal and the α,ω-dihydropolydialkylsiloxane and/or a polyalkyldihydrosiloxane is thermally treated and the resultant reaction product is used for the polymerization.

DETAILED DESCRIPTION AND EMBODIMENTS OF THE INVENTION

The starting propyne monomers used in the present invention are 1-monoalkyldimethylsilyl-1-propynes whose monoalkyl moiety has from 1 to 4 carbon atoms and include, for example, 1-trimethylsilyl-1-propyne, 1-ethyldimethylsilyl-1-propyne, 1-n-propyldimethylsilyl-1-propyne and the like.

The compounds of transition metals of Group V include, for example, halides of the transition metals such as bromides and chlorides of niobium, tantalum and the like. Specific examples include $TaCl_5$, $NbCl_5$, $TaBr_5$, $NbBr_5$ and the like. Of these, $TaCl_5$ and $TaBr_5$ are preferred. The compound is usually used in an amount of from 0.01 to 10 mole %, preferably from 0.05 to 5 mole % of the starting monomer.

The α,ω-dihydropolydialkylsiloxane used in combination with the transition metal compound should preferably be a hydrosiloxane compound having a hydrogen atom at both ends and represented by the following general formula

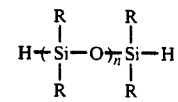

wherein each R represents an alkyl group having from 1 to 8 carbon atoms, and n is an integer of from 1 to 6. Examples of the alkyl group include a methyl group, an ethyl group, a propyl group, a butyl group, a pentyl group, a hexyl group, a heptyl group and an octyl group. Preferably, the R of the formula is a methyl group.

The polyalkyldihydrosiloxane should preferably be a siloxane polymer having the hydrogen atom bonded directly to the silicon atom or atoms of intermediate siloxane units and represented by the following general formula

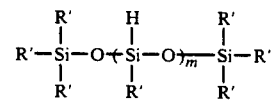

wherein each R' represents an alkyl group having from 1 to 8 carbon atoms and m is an integer of not less than 1. The alkyl group represented by R' is the same as used in the α,ω-dihydropolydialkylsiloxane. The polymer of the above formula wherein the terminal trialkylsilyl group is absent, thereby forming a cyclic polymer, may also be used.

These α,ω-dihydropolydialkylsiloxanes and polyalkyldihydrosiloxanes are commercially available from Shin-Etsu Co., Ltd., Chisso Co., Ltd. and Toray Silicone Co., Ltd. of Japan. These siloxane compounds and/or polymers may be used singly or in combination.

The amount of the α,ω-dihydropolydialkylsiloxane and/or polyalkyldihydrosiloxane is not critical but is preferably as small as possible in order to minimize its incorporation as an impurity into a final polymer product. In general, the amount is from 1 to 10 mole %, as the hydrogen atom or atoms bonded directly to the silicon atom or atoms, based on the monomer.

The polymerization reaction is performed in a solvent. Examples of the solvent include aromatic hydrocarbons such as benzene, toluene, xylene and the like, halogenated hydrocarbon such as 1,2-dichloroethane, carbon tetrachloride, chloroform, 1,2,3-trichloropropane, trichloroethylene, chlorobenzene and the like, alicyclic hydrocarbons such as cyclohexane, cyclohexene and the like, and mixtures thereof. The monomer concentration at the polymerization reaction is generally from 0.1 to 2 moles per liter of the solvent, preferably from 0.3 to 1 mole per liter of the solvent.

The order of addition of the solvent, monomer, compound of a transition metal of Group V and α,ω-dihydropolydialkylsiloxane and polyalkyldihydrosiloxane is not critical. In general, a transition metal compound and an α,ω-dihydropolydialkylsiloxane and/or polyalkyldihydrosiloxane are first added to a solvent in predetermined amounts and heated to about 60° C. for 5 to 15 minutes. During this treatment, it is assumed that the transfer metal is reduced with the hydrogen bonded to the silicon atoms of the siloxane compound or polymer, thereby forming a reaction product serving as a polymerization initiator. Thereafter, the mixture is cooled down to about 0° C., to which a predetermined amount of monomer is added. The polymerization reaction may proceed at temperatures not higher than 0° C. and is completed in about 1 hour to several hours at a temperature of 30° C. The reaction temperature is generally in the range of from 0° to 80° C., preferably from 30° to 70° C. Higher temperatures may be used but are not favorable in economy.

Alternatively, an α,ω-dihydropolydialkylsiloxane and/or polyalkyldihydrosiloxane may be added after keeping a solution of the monomer and the transition metal compound at a given temperature sufficient to cause the reaction between the transition metal and the siloxane.

The reaction solution obtained after completion of the polymerization may be purified by a so-called reprecipitation technique wherein the solution is added to a large amount of a poor solvent thereby precipitating the resultant polymer. Examples of the poor solvent include alcohols such as methanol, ethanol and the like.

It will be noted that although the polymerization may be effected in an atmosphere of air, it is usually effected in an atmosphere of an inert gas such as nitrogen.

The polymer obtained by the polymerization process of the invention becomes very high in molecular weight, e.g. not only the polymerization reaction solution becomes very viscous, but also the reaction may proceed to an extent where a solid product is obtained. In the latter case, the reaction system is diluted with a solvent and subjected to re-precipitation.

The gel permeation chromatography of the polymer reveals that its weight average molecular weight ($\overline{M}w$) is about 1,000,000 or over.

The polymer obtained by the above process is film-forming. When the film obtained from the polymer is thermally treated at 100° C. for 5 hours as reported by Higashimura et al set out before, the oxygen permeability coefficient undergoes little degradation of the oxygen permeability coefficient. The reason for this is not clear. Several factors may be considered including a structural change of the polymer because of the presence of a α,ω-dihydropolydialkylsiloxane and/or polyalkyldihydrosiloxane in the reaction system, a change in the cis-trans structure of the double bonds in the propyne compound owing to the polymerization reaction at low temperatures, e.g. at room temperature, and a very high degree of polymerization taking place. Anyway, the final polymer product has a high gas permeability and a very small degree of characteristic degradation, thus being useful in practical applications. The polymers obtained by the process of the invention will have utility not only as a gas permeation membrane, but also as electronic and insulating materials.

The present invention is more particularly described by way of examples.

EXAMPLES 1 TO 6

200 ml of purified toluene, 2 mmols of tantalum pentachloride ($TaCl_5$) as a compound of a metal of Group V and 0.5 g of a polyalkyldihydrosiloxane (SH-1107, available from Toray Silicone Co., Ltd.) were charged in an atmosphere of dry nitrogen into a three-necked flask equipped with an agitator, a thermometer and a separating funnel and having a capacity of 300 ml, followed by heating to 60° C. for 10 minutes. Thereafter, the mixture was cooled down to 0° C. (ice bath), to which 0.2 moles of 1-trimethylsilyl-1-propyne was added, followed by polymerization reaction for 3 hours under agitation. A very viscous polymer solution was charged into a large amount of methanol to obtain a polymer precipitate.

The thus obtained polymer was purified by re-precipitation, after which the molecular weight and gas permeation characteristic were measured. As a result, the weight average molecular weight was 1,200,000 when determined gel permeation chromatography using polystyrene as a reference and the oxygen gas permeability coefficient was $1.46 \times 10^{-6}$ cc·cm/cm²·sec·cmHg.

The above procedure was repeated using different transition metal compounds and/or different polyalkyldihydrosiloxanes as Examples 2 to 6. The results are shown in Table below.

TABLE

| Example | Transition Metal Compound | Polymethyl-hydrosiloxane | Weight Average Molecular Weight $\overline{M}w$ | $\overline{P}_{O_2}$*1 |
|---|---|---|---|---|
| 1 | $TaCl_5$ | SH-1107 | 1,200,000 | $1.46 \times 10^{-6}$ |
| 2 | $NbCl_5$ | SH-1107 | 1,200,000 | $8.6 \times 10^{-7}$ |
| 3 | $NbBr_5$ | SH-1107 | 1,000,000 | $7.6 \times 10^{-7}$ |
| 4 | $TaCl_5$ | KF-99*2 | 1,500,000 | $1.6 \times 10^{-6}$ |
| 5 | $TaCl_5$ | $H-\underset{\underset{CH_3}{\|}}{\overset{\overset{CH_3}{\|}}{Si}}-O-\underset{\underset{CH_3}{\|}}{\overset{\overset{CH_3}{\|}}{Si}}-H$ | 1,100,000 | $1.2 \times 10^{-6}$ |

TABLE-continued

| Example | Transition Metal Compound | Polymethyl-hydrosiloxane | Weight Average Molecular Weight $\overline{Mw}$ | $\overline{P}_{O_2}$*1 |
| --- | --- | --- | --- | --- |
| 6 | TaCl$_5$ | PS 120*3 | 2,000,000 | $2.0 \times 10^{-6}$ |

Note
*1 oxygen permeability coefficient (cc · cm/cm$^2$ · sec · cmHg)
*2 KF 99 is polymethylhydrosiloxane available from Sin-Etsu Silicone Co., Ltd.
*3 PS 120 is a polymethylhydrosiloxane available from Chisso Co., Ltd.

Similar results were obtained when the general procedure of the above examples was repeated using polydimethylsiloxane terminated with hydrogen at both ends (PS-537, available from Petrarch System Inc. of U.S.A.).

What is claimed is:

1. A process for the preparation of 1-monoalkyl(-C$_1$-C$_4$)dimethylsilyl-1-propyne polymers which comprises polymerizing a 1-monoalkyl(C$_1$-C$_4$)dimethylsilyl-1-propyne monomer in the presence of a compound of a transition metal of Group V of the Periodic Table and a member selected from the group consisting of α,ω-dihydropolydialkylsiloxanes and polyalkyldihydrosiloxanes in a solvent inert for the polymerization.

2. A process according to claim 1, wherein said 1-monoalkyl(C$_1$-C$_4$)dimethylsilyl-1-propyne monomer is trimethylsilyl-1-propyne.

3. A process according to claim 1, wherein said compound is a halide of the transition metal.

4. A process according to claim 1, wherein said compound is used in an amount of from 0.01 to 10 mole % based on the monomer.

5. A process according to claim 1, wherein said member is an α,ω-dihydropolydialkylsiloxane of the following formula

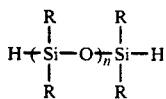

wherein each R represents an alkyl group having from 1 to 8 carbon atoms, and n is an integer of from 1 to 8.

6. A process according to claim 5, wherein the siloxane is used in an amount of from 1 to 10 mole %, as the hydrogen atom bonded directly to the silicon atoms at both ends, based on the monomer.

7. A process according to claim 5, wherein each R is a methyl group.

8. A process according to claim 1, wherein said member is a polyalkyldihydrosiloxane of the following formula

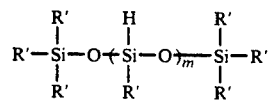

wherein each R' represents an alkyl group having from 1 to 8 carbon atoms and m is an integer of not less than 1.

9. A process according to claim 8, wherein said polyalkyldihydrosiloxane is used in an amount of from 1 to 10 mole %, as the hydrogen atom bonded directly to the silicon atom or atoms, based on the monomer.

10. A process according to claim 8, wherein each R' is a methyl group.

11. A process according to claim 1, wherein the polymerization is effected at a temperature of from 0° to 80° C.

12. A process according to claim 11, wherein the temperature is from 30° to 70° C.

13. A process according to claim 1, wherein said compound and said member are first added to the solvent and heated up to 60° C. and cooled, after which said monomer is polymerized.

14. A process according to claim 1, further comprising charging the resultant reaction solution into a poor solvent of a large amount, thereby precipitating a polymer formed by the polymerization.

15. A process according to claim 1, wherein the monomer is added in an amount of 0.1 to 2 moles per liter of the solvent.

* * * * *